United States Patent

[11] 3,615,708

| [72] | Inventor | Emile Jean Maurice Abile-Gal<br>27 rue du General Fay, Paris, France |
|---|---|---|
| [21] | Appl. No. | 745,919 |
| [22] | Filed | July 18, 1968 |
| [45] | Patented | Oct. 26, 1971 |
| [32] | Priority | Aug. 11, 1967 |
| [33] | | France |
| [31] | | 117,803 |

[54] INDIVIDUAL FILTER FOR PRESERVING AND PREPARING BEVERAGES
6 Claims, 2 Drawing Figs.

[52] U.S. Cl. .................................................. 99/171 P, 99/295
[51] Int. Cl. .................................................. B65d 37/00
[50] Field of Search ........................................ 99/77.1, 295, 171 I

[56] References Cited
UNITED STATES PATENTS

| 2,292,101 | 8/1942 | Brown .......................... | 99/77.1 |
| 2,805,164 | 9/1957 | Doppler ....................... | 99/171 I |
| 3,083,101 | 3/1963 | Noury ......................... | 99/77.1 |
| 3,344,734 | 10/1967 | Aquirre-Batres et al. .... | 99/77.1 X |

*Primary Examiner*—Tim R. Miles
*Assistant Examiner*—Steven H. Markowitz
*Attorney*—Bryan, Parmelee, Johnson & Bollinger ABSTRACT: Individual filter for preserving portions for making a beverage by contact with a fluid, this filter being made of a cylindrical external casing in which a filtering pouch is fixed containing a portion of substance, the ends of the casing being closed in a sealtight manner for tearing with a view to the passage of the fluid for making the beverage.

PATENTED OCT 26 1971

3,615,708

INVENTOR.
Emile J. M. Abile-Gal
BY
Robertson, Bryan, Parmelee & Johnson
ATTORNEYS.

INDIVIDUAL FILTER FOR PRESERVING AND PREPARING BEVERAGES

The invention relates to an individual filter for preserving solutions, dilutions or infusions ready for consumption, which occur in the form of portions of substances that can be conveniently brought into contact with a fluid, filter characterized in that it is made of a tubular protecting casing in which a filtering pouch is fixed containing a portion of a selected substance, the upper and lower ends of the casing being closed in a sealtight manner and able to be torn for permitting the passage of a fluid making a beverage.

According to one characteristic of the invention, parts of the inner walls of the upper and lower ends of the tubular casing are brought together, then tightened one against the other and remain assembled, in a definite manner, by sticking, soldering or the like.

Figure 1:
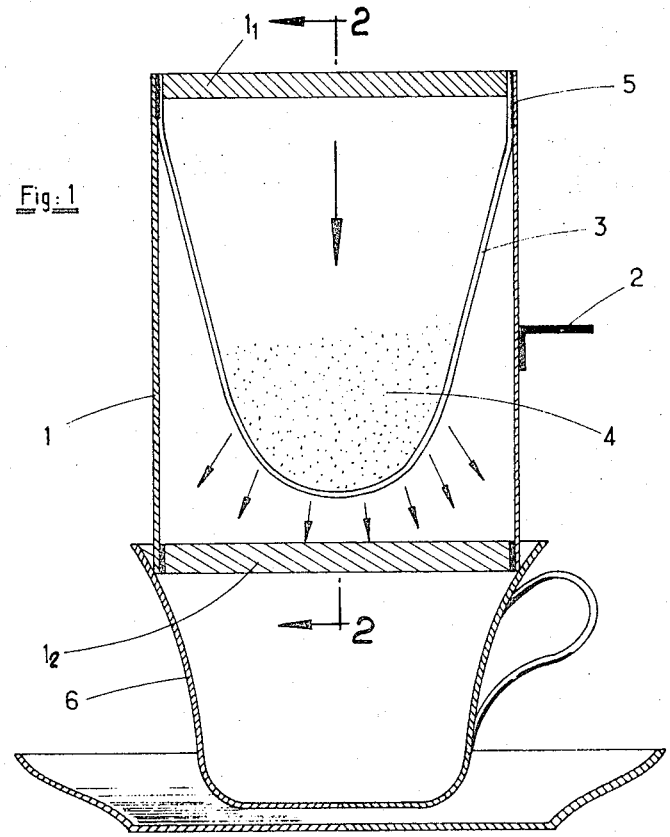
Figure 2:
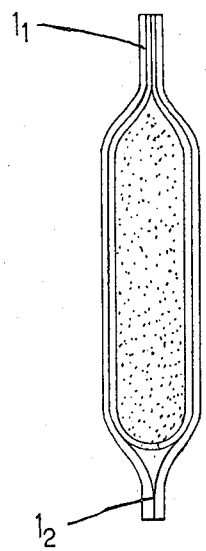

A filter, according to the invention, is shown by way of nonrestrictive example in the attached figures, in which:

FIG. 1 is a sectional view of the filter in usage according to the invention, fitted on a coffee cup, FIG. 2 is a sectional view of the filter in its collapsed and sealed state during storage as taken along the line 2—2 in FIG. 1 prior to usage.

One of the essential objects of the invention is to produce an individual filter that can be used in a simple manner without being obliged to employ any kind of equipment, such as a machine.

This individual filter is actually operated by hand and can be used at any place, even in the open air.

According to one example of embodiment, the filter according to the invention is made of a tubular protecting casing 1, specifically able to be of cylindrical shape, said casing being made of relatively deformable material such as cardboard, stout paper, plastic, aluminum sheeting, or the like.

Of course, this protecting casing, can, for hygienic purposes, by covered internally with a material like those known in food packaging, silvered paper, for instance.

Furthermore, the protecting casing 1 can comprise externally a gripping means so that the user can hold the filter vertically on the coffee cup without the risk of burning his fingers.

In the example of embodiment shown, this gripping means is a cardboard handle 2 stuck on the external wall of the casing.

A filtering pouch 3 is definitely fixed inside the protecting casing, acting as container for the portion of substance selected 4.

This pouch is assembled by sticking, soldering, heat-sealing, crimping or the like, on a peripheric strip 5 situated on the inner wall of the top part of the tubular casing 1.

This assembling is shown by firm lines in FIG. 1.

This filtering pouch container 3 can be made of any porous material, for instance, of blotting paper, so that the fluid poured into the pouch through the top end of the tubular casing, can impregnate the substance present, pass through the pouch and slowly flow into the receiving receptacle, specifically into a coffee cup 6.

One of the particularities of the filter lies in the fact that the top $1_1$ and bottom $1_2$ parts of the tubular protecting casing 1 are provided with assembling means, for instance, heat-sealed portions extending part of the way up.

Thus, the bringing together together and flattening as shown in FIG. 2, of the top and bottom portions, $1_1$ and $1_2$ of the protecting casing enable, by sticking or partial melting along the top and bottom positions $1_1$ and $1_2$, a sealtight closing of the filter, so that the product thus imprisoned can be preserved as long as possible. The material and character of the protective casing 1 are described above. In this connection, a vacuum can be produced in the container pouch for prolonging the preserving of the substance.

During its closing, the initially cylindrical casing, is flattened owing to the bringing together of the inner walls of the upper and lower ends, which justifies the employing of a relatively deformable material as described above.

It will be advisable to give the tubular protecting casing 1 a diameter adapted to the average standard size of commercialized cups, so that the filter can rest on the inner top of the cup without the risk of touching the beverage contained in the cup 6.

The method of using a filter of this kind is most simple in itself.

It suffices, by cutting or tearing, to detach the upper $1_1$ and lower $1_2$ ends of the protecting casing 1 so as to enable a fluid, water, for instance, to be able to pass through the tubular casing completely.

When the heat-sealed strips $1_1$ and $1_2$ are detached from the rest of of the tubular casing, simple pressure of the fingers restores its initially cylindrical shape to the filter.

It t then suffices to place the filter vertically on the top of the cup and pour into the container pouch 3 the selected liquid to obtain, for instance, in the case of powdered coffee and water, an instant coffee.

Of course, the materials forming the filter could be varied at will without going outside of the scope of the invention for that purpose, and the means of closing the tubular casing could also be modified, without going outside of the field of the invention.

Lastly, the filter can be individual, i.e., suitable for a single cup of coffee, but it could, of course, be made of larger dimensions, to enable several cups to be made.

The filter according to the invention could enable all kinds of beverages to be made, such as coffee, tea and infusions of all kinds.

What I claim is:

1. A filter and external protective casing for preserving solutions, dilutions or infusions ready for consumption, which occur in the form of portions of substances that can conveniently be brought into contact with a fluid, said filter and external casing being characterized in that it comprises an external protective casing 1 made of readily deformable material able to be manually bent into tubular shape for usage in which a filtering pouch 3 is fixed, said pouch being made of porous material and containing a portion of a selected substance 4, said pouch being fixed to said tubular external casing around the upper periphery 5 of said pouch in relation to the position of said pouch when the casing has been bent into the tubular shape in readiness for usage, said casing when in its tubular form being sufficiently strong to support the pouch by the upper periphery thereof, said filter and external casing being characterized in that prior to usage the casing and pouch therein are folded into flattened configuration for storage with the upper and lower ends ($1$ and $1_2$) of the external casing 1 being closed in a sealtight manner to protect the pouch and its contents, said sealed ends being capable of being manually torn open to enable the casing to be bent into tubular configuration in readiness for usage, whereby the passage of a fluid through the pouch and its contents will make a beverage.

2. Filter and external protective casing according to claim 1, characterized in that the tubular casing 1 is:
   a. of cardboard, silvered inside,
   b. of paper, provided with a lining,
   c. of plastic flexible material or the like.

3. Filter and external protective casing according to claim 1, characterized in that the filtering pouch 3 is made of porous material, such as blotting paper.

4. A filter and external protective casing as claimed in claim 1, in which said filtering pouch is affixed to the protective casing by a peripheral strip situated on the inner wall of the upper part of the casing.

5. A filter and external protective casing as claimed in claim 1, characterized in that said external protective casing 1 is of such size that when bent into tubular shape in readiness for usage its diameter is adapted to match with the inner top of the average standard size of commercial cup, whereby the casing can rest on the inner top of the cup to support the pouch therein without touching the beverage in the cup.

6. A protective hermetically sealed package for preserving solutions, dilutions, or infusions ready for consumption, which occur in the form of a portion of food substances that can conveniently be brought into contact with a fluid, said protective hermetically sealed package being characterized by an external protective tubular casing, said casing being made of readily deformable material, a filter pouch of porous material, said pouch having its upper end affixed to the tubular casing around the upper periphery of said pouch suspending the pouch within said casing, said pouch being partially filled with a food substance, said tubular casing being flattened to form said package with the upper and lower ends of said protective tubular casing being sealed in a hermetically sealed manner to protect the pouch and its contents, said sealed ends being capable of being manually torn open for bending the casing into cylindrical shape when the package is put into usage for the passage of a fluid through the pouch and its contents for making a beverage.

* * * * *